United States Patent [19]
Parrish et al.

[11] Patent Number: 5,404,173
[45] Date of Patent: Apr. 4, 1995

[54] METHOD TO SYNCHRONIZE VIDEO MODULATION USING A CONSTANT TIME BASE

[75] Inventors: Gregory C. Parrish, Long Beach; Benjamin E. Felts, III, Cardiff; Sanjay K. Jha, San Diego; David J. Wicker, Poway, all of Calif.

[73] Assignee: Brooktree Corporation, San Diego, Calif.

[21] Appl. No.: 29,121

[22] Filed: Mar. 10, 1993

[51] Int. Cl.⁶ .......................... H04N 5/04; H04N 5/06
[52] U.S. Cl. .................................. 348/537; 348/538; 348/539; 331/20
[58] Field of Search ............... 358/149, 148, 150, 151, 358/153, 154, 155, 158, 159, 160, 21 R, 17, 19, 83, 22, 140; H04N 5/04, 5/06; 340/814, 733, 734; 331/17, 18, 20, 25

[56] References Cited

U.S. PATENT DOCUMENTS

| | | | |
|---|---|---|---|
| 3,819,859 | 6/1974 | Bursuk et al. | 348/531 |
| 4,206,479 | 6/1980 | Hayward | 358/160 |
| 4,492,979 | 1/1985 | Ikeda | 358/154 |
| 4,638,358 | 1/1987 | Nozoe et al. | 358/148 |
| 5,150,201 | 9/1992 | Mehrgardt et al. | 358/149 |
| 5,168,246 | 12/1992 | Pulluru et al. | 358/158 |

*Primary Examiner*—Victor R. Kostak
*Assistant Examiner*—Michael H. Lee
*Attorney, Agent, or Firm*—Ellsworth R. Roston; Charles H. Schwartz

[57] ABSTRACT

Successive pixels representing video data in successive lines in a raster scan are buffered. Each of the lines has a sync pulse defining the line beginning. A phase adjustment is determined between the sync pulse, preferably at a particular level in the sync pulse, and an adjacent one of system adjacent clock signals at a particular frequency. The actual or expected phase adjustment between the pixels at the end of each line is also determined. The difference between the phase adjustments at the beginning and end of each line is then determined. Progressive adjustments are made in the phase of each successive pixel in the line relative to the system clock signals in accordance with the number of system clock signals in the line and the determined difference in the phase adjustment between the line beginning and end. In this way, the pixels of video data are synchronized with the system clock signals. When the actual phase adjustment relative to the system clock signals is determined at the end of each line, the difference in the phase adjustments at the beginning and end of such line is determined from the phase adjustment for such line and the phase adjustment stored for the previous line. When the expected phase adjustment is provided for the end of each line, this estimated value is altered for each line by an amount equal to the actual phase adjustment at the beginning of such line and the estimated phase adjustment at the end of such line.

19 Claims, 3 Drawing Sheets

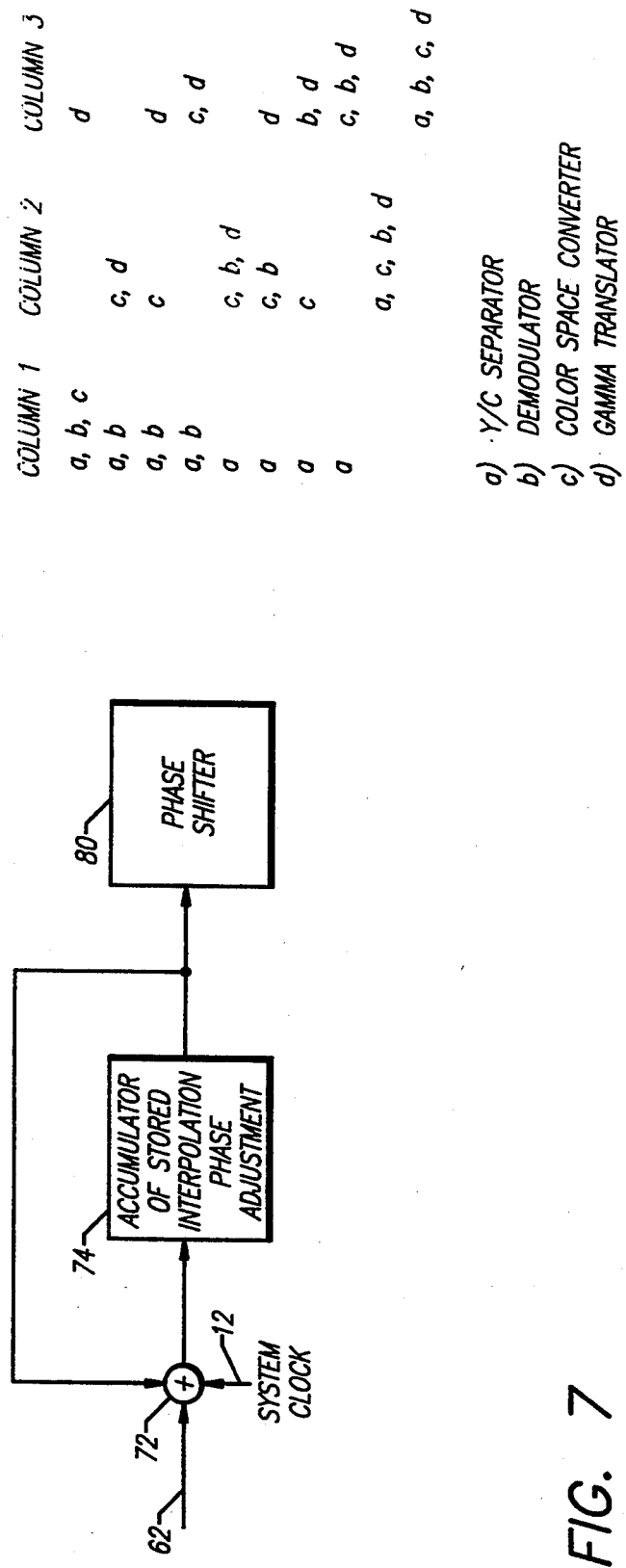
|          | COLUMN 1 | COLUMN 2 | COLUMN 3 |
|----------|----------|----------|----------|
|          | a, b, c  | d        | d        |
|          | a, b     | c, d     | d        |
|          | a, b     | c        | c, d     |
|          | a        | c, b, d  | d        |
|          | a        | c, b     | b, d     |
|          | a        | c        | c, b, d  |
|          |          | a, c, b, d |        |
|          |          |          | a, b, c, d |
a) Y/C SEPARATOR
b) DEMODULATOR
c) COLOR SPACE CONVERTER
d) GAMMA TRANSLATOR
*FIG. 6*
*FIG. 4*
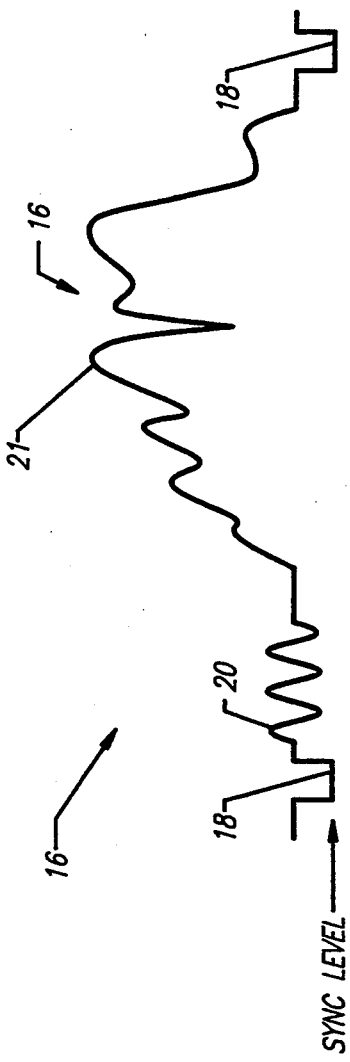
*FIG. 7*

METHOD TO SYNCHRONIZE VIDEO MODULATION USING A CONSTANT TIME BASE

This invention relates to apparatus for, and methods of synchronizing incoming video data in the form of pixels in successive lines in a raster scan to coincide with successive system clock signals at a particular frequency. The invention is especially adapted to be used in a graphics system.

Video data in the form of successive pixels in each line of a raster scan is often provided for use in a graphics system. For example, graphics data may be displayed on the face of a video monitor and the video may be displayed on a window on the face of this video monitor. The pixels are often presented from an external source such as from a tape at a frequency different from the clock in the graphics system in which the video data is to be displayed. Furthermore, the frequency of the video data sometimes varies somewhat. This results from the fact that the lengths of the successive lines of the pixels tend to vary somewhat.

Conventionally, the frequency of the system clock signals has been varied to attempt to have this frequency conform to the frequency at which the pixels in the video data are presented. This has presented complications. For example, since the frequency of the video data is not constant, the frequency of the system clock signals tends to vary with time. Furthermore, since the operation of the system is tied to the frequency of the system clock signals, variations in the frequency of the system clock signals tends to produce complications in the operation of the system.

In addition to the horizontal sync signal at the beginning of each line, there is also a burst of sinusoidal signals at a sub-carrier frequency. In the NTSC system used in the United States, this frequency is at approximately 3.56 megahertz. In a system developed by Fujitsu and disclosed in "SINGLE-CHIP DIGITAL PLL LSI FOR TELEVISION IMAGE-PROCESSING SYSTEMS" published in FIND, Vol. 10, No. 1, Feb. 1991, the pixels of video data are synchronized in time with the signals at the sub-carrier frequency. Although this system constitutes an improvement over the conventional system discussed in the previous paragraph, it still has significant limitations. It does not synchronize the video data with the system clock signal, thereby still producing complications in the operation of the system. Furthermore, the Fujitsu system provides only one adjustment per line. This causes deviations to occur in the successive pixels in each line from the subcarrier frequency as a reference.

Video data in the form of successive pixels in a raster scan have been provided for display on the face of a video monitor for many years. In that period of time, the limitations in the systems of the prior art have been known and consideration has been given in all of that period to providing a system which will surmount these limitations.

This system provides a system which surmounts the limitations specified above. The system synchronizes the video data with the system clock signals. Furthermore, the system of this invention provides progressive corrections in the timing of progressive pixels in each line of video data in accordance with the timing of the successive system clock signals in that line.

In one embodiment of the invention, successive pixels representing video data in each of successive lines in a raster scan are buffered. Each of the lines has a sync pulse defining the beginning of the line. System clock signals are provided at a particular frequency. A phase adjustment is determined between the sync pulse, preferably at a particular level in the sync pulse, and the adjacent system clock signal. The actual or expected phase adjustment between the pixels at the end of each line are also determined.

The difference between the phase adjustments at the beginning and end of each line is then determined. Progressive adjustments are made in the phase of each successive pixel in the line relative to the system clock signals in accordance with the number of the system clock signals in the line and the determined difference in the phase adjustment between the beginning and end of the line. In this way, the pixels of video data are synchronized with the system clock signals.

When the actual phase adjustment relative to the system clock signals is determined at the end of each line, the difference in the phase adjustments between the beginning and the end of such line is determined from the phase adjustment for such line and the phase adjustment stored for the previous line. When the expected phase adjustment is provided for the end of each line, this estimated value is altered for each line by an amount equal to the actual phase adjustment at the beginning of such line and the estimated phase adjustment at the end of such line.

In the drawings:

FIG. 4 is a circuit diagram in simplified block form and shows in additional detail another of the stages shown in FIG. 1;

FIG. 5 shows a modification in simplified block form of the embodiment shown in FIG. 1;

FIG. 6 is a chart showing the combinations of the different types of stages which can be included in the blocks designated as "1", "2" and "3" in the embodiments shown in FIGS. 1 and 5; and FIG. 7 is a schematic representation of one of the lines of video data provided to the embodiments shown in the previous Figures.

Figure 1:
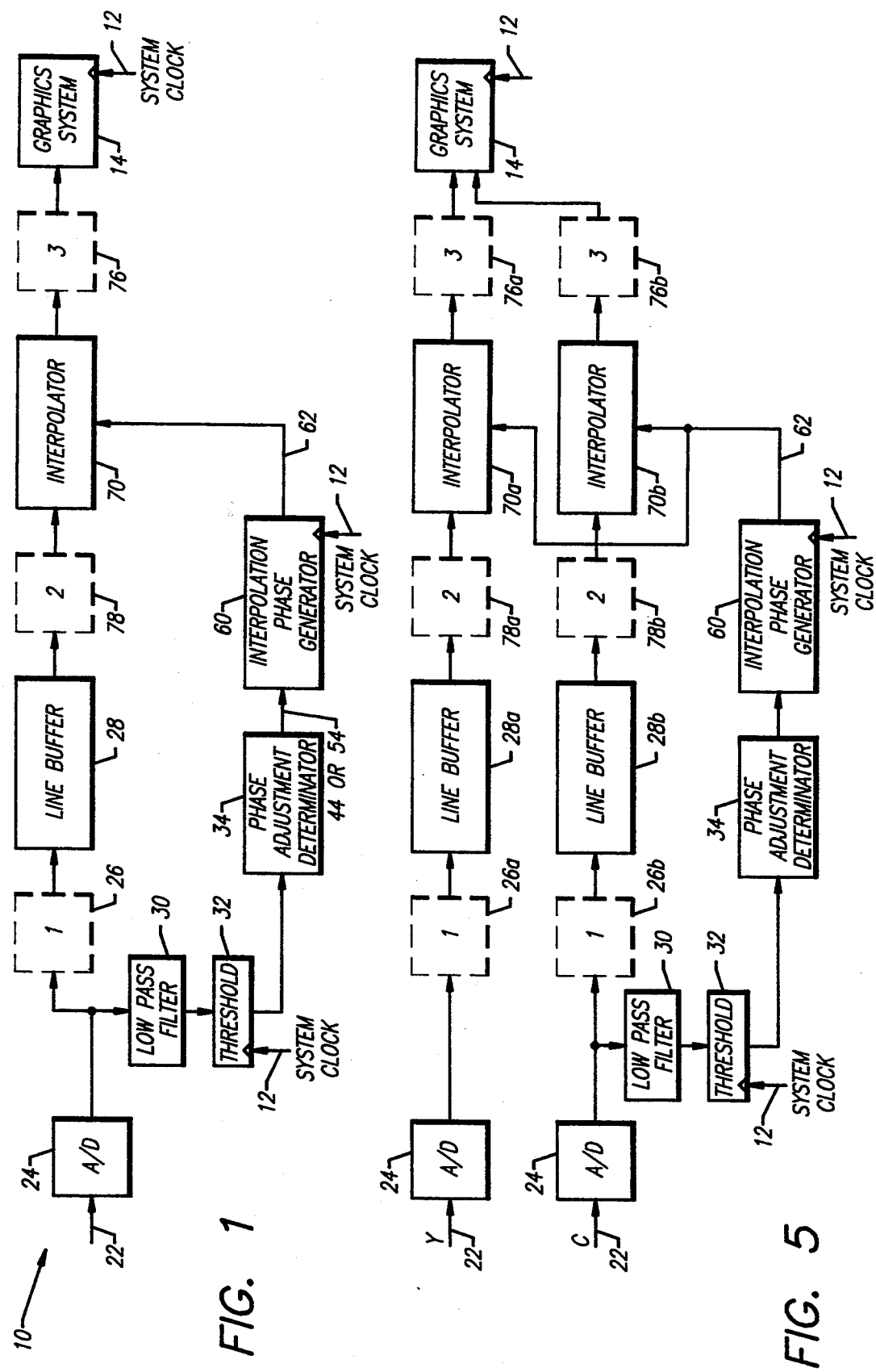
FIG. 1 is a circuit diagram in simplified block form of one embodiment of the invention.

In the embodiment of the invention shown in FIG. 1, a system generally indicated at 10 is provided as on an integrated circuit chip for synchronizing video data with a system clock signal which is introduced on a line 12 with a substantially constant frequency. For example, the system clock frequency may be generated as by a crystal. The system clock signal synchronizes the operation of a graphics system 14 which operates in conjunction with this invention. For example, the graphics system 14 may receive the video data after processing of the data by the embodiment shown in FIG. 1 and may combine the processed video data with graphics data from the graphics system 14. As one illustration, the graphics data may be visually presented on the face of a video monitor (not shown) and the video data may be visually presented in a window on the face of the video monitor.

The video data may be in the form conventionally presented as in broadcast video or in a video tape recorder or in S- video. S- video provides two (2) channels of information such as shown in FIG. 5 and described in detail subsequently. The video data may be presented in successive lines in a conventional raster scan. One of these lines is generally indicated at 16 in FIG. 7. It includes a horizontal sync signal 18 which defines the beginning of the line. It also includes a plurality of burst signals at a particular frequency such as approximately 3.56 megahertz schematically illustrated at 20 in FIG. 7. It further includes video data schematically illustrated at 21 in FIG. 7. The video data may be in the form of successive pixels for presentation on the face of a video monitor (not shown).

The video data is introduced in analog form on a line 22 in FIG. 1 and is converted to a digital form in a stage 24. The information in digital form is then introduced to a stage 26 designated in FIG. 1 as "1". This stage may have several different forms as indicated in a chart shown in FIG. 6 and as will be discussed in detail subsequently. The information from the stage 26 may then be introduced to a buffer 28 which may be constructed in a conventional manner. The buffer 28 stores the digital information for the successive pixels and releases the pixels in sequence from the buffer in the order in which the pixels are introduced to the buffer. In effect, the buffer 28 constitutes a first-in first-out (FIFO) shift register. The buffer 28 may store the visual data for a whole line or a part of a line.

The digital signals from the converter 24 are introduced to a low pass filter 30 which passes signals in a relatively low range of frequencies such as approximately zero to five megahertz (0–5 Mhz). The low pass signals from the filter 30 then pass to a threshold stage 32 which produces a signal when the low pass signals pass through a particular voltage level. The threshold stage 32 also receives the system clock signals on a line 12 and produces a phase adjustment signal representing the difference in phase between the threshold level of the low pass signals and a particular portion, such as the rising edge, of the adjacent system clock signal. The phase adjustment signal represents the phase adjustment at the beginning of each line of pixels representing the video data.

A phase adjustment determinator 34 receives the phase adjustment at the beginning of each line of pixels and the phase adjustment at the end of the line and determines the difference between these phase adjustments. This difference represents the change in the phase adjustment through the line. The phase adjustment at the end of each line of pixels may be either an actual phase adjustment or an estimated phase adjustment at the end of the line.

Figure 2:
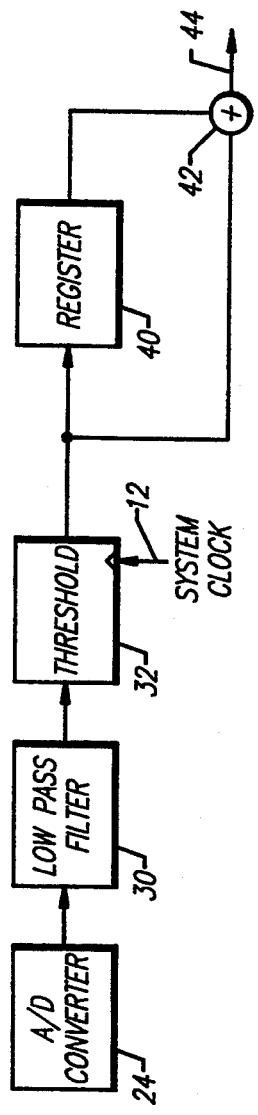
FIG. 2 is a circuit diagram in simplified block form and shows in additional detail a first embodiment of a particular one of the stages shown in FIG. 1.

The circuitry for determining the actual phase adjustment through each line on the basis of the difference between the actual phase adjustment at the beginning and end of each line is shown in FIG. 2. It includes the threshold stage 32 and a register 40. The phase adjustment signal from the threshold stage for each line of pixels is introduced to a register 40 which stores the phase adjustment signal and introduces the stored signal to an arithmetic stage 42. The arithmetic stage 42 also receives the phase adjustment signal from the threshold stage 32. In this way, the arithmetic signal determines the difference between the phase adjustment signals at the beginning of successive pairs of lines. The difference signal from the arithmetic stage 42 is introduced to a line 44.

Figure 3:
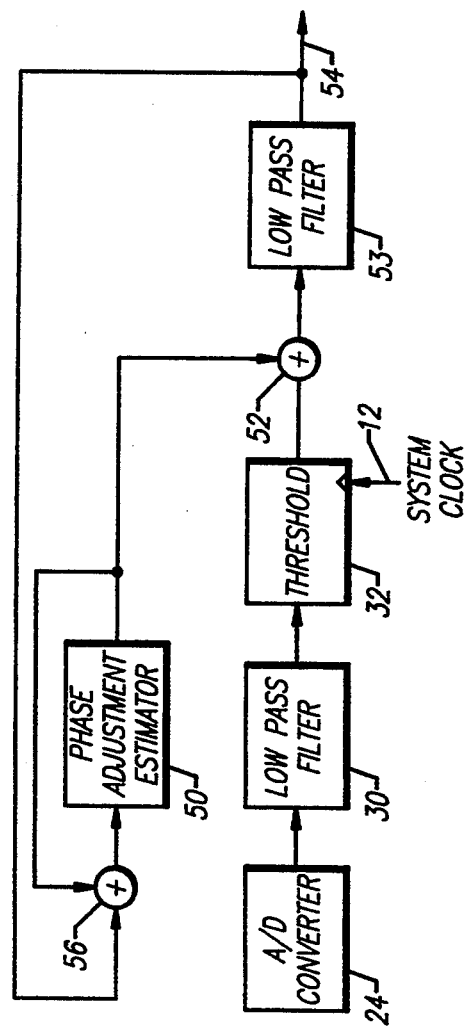
FIG. 3 is a circuit diagram in simplified block form and shows in additional detail another embodiment of the particular one of the stages shown in FIG. 1.

The circuitry for determining the estimated phase adjustment through each line on the basis of the difference between the estimated phase adjustment at the end of each line and the actual phase adjustment at the beginning of each line is shown in FIG. 3. The system shown in FIG. 3 includes the threshold stage 32 and a stage 50 indicating the estimated phase adjustment at the end of each line. The phase adjustments from the threshold stage 32 and the phase adjustment estimator 50 are introduced to an arithmetic stage 52 which determines the difference between such phase adjustments. The signal from the arithmetic stage 52 for each line of pixels represents the expected phase adjustment through such line of pixels.

The signal from the arithmetic stage 52 for each line of pixels is introduced to a low pass filter 53 which introduces signals at relatively low frequencies such as zero to five megahertz (0–5 Mhz) to a line 54. The signals on the line 54 pass to an arithmetic stage 56. The arithmetic stage 56 also receives the output from the phase adjustment estimator 50 and adjusts the estimated phase adjustment in accordance with the signal on the line 54. In this way, the phase adjustment estimator 50 adjusts the estimated phase adjustment for each line of pixels in accordance with the adjustments made on the line 54 for the previous line of pixels.

The signal on the line 44 in FIG. 2 in representation of the actual phase adjustment through a line of pixels or the signal on the line 54 in representation of the estimated phase adjustment through a line of pixels is introduced to an interpolation phase generator 60 in FIG. 1. The interpolation phase generator 60 also receives the system clock signals in each line of pixels and determines the number of the system clock signals in such line. The interpolation phase generator 60 then determines the phase adjustment for each system clock signal in each line. In effect, the interpolation phase generator 60 divides the actual or estimated phase adjustment per line by the number of the system clock signals in the line. Thus, the interpolation phase generator 60 may be considered as a multiplier which multiplies the actual or expected phase adjustment per line by 1/N where N is the number of system clock signals per line. The results of the division are provided on a line 62 in FIGS. 1, 4 and 5.

The signals from the interpolation phase generator 60 in FIG. 1 are introduced to an interpolator 70 in FIG. 1. The interpolator 70 also receives the output from a stage 78 which is designated as "2" in FIG. 1. The input of the stage 78 is connected to the output of the line buffer 28 in FIG. 1. The stage 78 may take a number of different forms as shown in FIG. 6 and as described in detail subsequently.

The interpolator 70 accumulates the phase adjustment per system clock signal on the line 62 in FIG. 1 for the successive clock signals in each line of pixels and adjusts the phases of the successive pixels from the line buffer 28 in accordance with the accumulated phase adjustments for the successive system clock signals in that line. The interpolator 70 is shown in additional detail in FIG. 4.

The interpolator 70 includes an arithmetic stage 72 and an accumulator 74 of the stored interpolation phase in FIG. 4. The arithmetic stage 72 receives the output on the line 62 (also shown in FIG. 1) in representation of the phase adjustment per system clock signal in each line of pixels. The arithmetic stage 72 also receives the output from the accumulator 74 and adds this output to the phase adjustment per system clock signal every time that a system clock signal appears on the line 12. In this way, the accumulator 74 progressively accumulates the phase adjustment per system clock signal as the system clock signals progressively occur throughout each line of pixels. This phase adjustment is then introduced to a phase shifter 80. The pixel data is shifted accordingly in phase.

The signals from the interpolator 70 are introduced to a stage 76 designated as "3" in FIG. 1. The stage 76 has various possibilities of forms as shown in FIG. 6 and discussed in detail subsequently. The signals from the stage 76 pass to the graphics system 14 the operation of which is synchronized with the system clock signals on the line 12. The graphics system 14 may illustratively provide graphics information from a display memory (not shown) at the frequency of the system clock signals. The information in the display memory may be displayed on the face of a video monitor (not shown). The visual data represented by the pixels in each line may be displayed in a window on the video monitor.

FIG. 6 illustrates some of the various forms in which the stages 26, 76 and 78 may operate. Three columns are shown in FIG. 6. The first column indicates the form in which the stage 26 may operate. This column is designated as "1" to conform to the designation for the stage 26 in FIG. 1. The second column is designated as "2" to correspond to the designation "2" for the stage 78 in FIG. 1. The indications in column 2 in FIG. 6 indicate the different forms in which the stage 78 may operate. The third column in FIG. 6 indicates the form in which the stage 76 may operate. The third column in FIG. 6 has the designation "3" to correspond to the designation "3" for the stage 76 in FIG. 1.

As will be seen, the indications in the three (3) different columns in FIG. 6 have the designations "a", "b", "c", "d". Below the columns in FIG. 6, but included in FIG. 6, are descriptions of the forms identified by the designations "a", "b", "c" and "d". All of the forms "a", "b", "c" and "d" are well known in the art. A stage such as the stage "1" (the stage 26) may have the designation "a, b, c". This means that the stage "1" (the stage 26) may have either the form "a", the form "b" or the form "c". Alternatively, the designation "a", "b", "c" for the stage "1" (the stage 26) may have a combination of some or all of the stages "a", "b" and "c". The above description for the stage "1" (the stage 26) also applies to the stage "2" (the stage 72) and the stage "3" (the stage 76).

The designation "a" is identified at the bottom of FIG. 6 as a "Y/C Separator". As will be appreciated, the designation "Y" indicates the luminance of color pixels and the designation "C" indicates the chrominance of the color pixels. The "Y" and "C" components of color pixels are provided in an S-band video. FIG. 5 indicates an S-band video system generally indicated at 80 and corresponding to the system shown in FIG. 1. The system 80 has two (2) channels, one (1) for processing the "Y" component and the other for processing the "C" component. Each of these channels corresponds to the channel including the stages 26, 28, 78, 70 and 76 in FIG. 1. The stages in the "Y" channel are accordingly designated as "26a", "28a" "78a", "70a" and "76a" in FIG. 5. The stages in the "C" channel are similarly designated as "26b", "78b", "70b" and "76b". The outputs from the stages 76a and 76b are introduced to the graphics system 14 also shown in FIG. 1. The system shown in FIG. 6 additionally includes the stages 30, 32, 34 and 60 also shown in FIG. 1.

The designation "b" in FIG. 6 identifies a demodulator for separating the chrominance information "C" for the color pixels into the two (2) quadrature components "I" and "Q". The designation "C" in FIG. 6 identifies a color space converter. The color space converter changes the luminance and chrominance components of the color in the pixels in each line into indications of the three (3) primary colors red, green and blue.

The designation "d" identifies a gamma translator. The gamma translator is disclosed and claimed in application Ser. No. 07/987,367 filed by James Corona on Dec. 7, 1992 for "Apparatus For, and Methods of, Providing a Universal Format of Pixels and For Scaling Fields in the Pixels" and assigned of record to the assignee of record of this application. The gamma corrector receives binary bits, less than a particular number, of information for each of the primary colors and converts such information to binary bits of a particular number to identify each of such primary colors. For example, the gamma corrector converts six (6) bits of binary indications for each of the primary colors red, green and blue to eight (8) bits of binary indications for each of such primary colors. The gamma corrector provides such conversion with an error less than one half ($\frac{1}{2}$) of the value of the least significant binary bit for each of the primary colors.

The system constituting this invention has certain important advantages. It provides for the transfer of video data representing successive pixels in each line in a raster scan in synchronism with the system clock signals. Furthermore, the system determines the phase adjustment between the video pixels and the system clock signals at the beginning and the end of each line and then determines the difference between these phase adjustments. The system then uses this difference and the number of system clock signals in each line to provide progressive adjustments for the successive pixels in each line in accordance with the occurrence of the successive system clock signals in such line.

In another embodiment, it is possible to generate data at a sampling resolution different from the system clock which is provided in the integrated circuit chip. By adding or subtracting a (programmable) constant to the output 62 of the interpolation phase generator 60 (FIGS. 1 and 5), it is possible to vary the effective output rate from the frequency of the system clock signals on the line 12. The data will be aligned to signals at a constant frequency above or below the system clock frequency.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:
1. In combination,
   first means for providing video data in a raster scan having successive lines and having successive pixels in each of the successive lines and having a horizontal sync pulse in each of the successive lines to define the beginning of such line,
   second means for providing system clock signals at a particular frequency, third means for determining the difference in time between each horizontal sync pulse and the adjacent one of the system clock signals to determine a phase adjustment to be made per line in the video data for providing the video data in synchronism with the system clock signals, fourth means for determining the number of system clock signals in each line of the video data, and fifth means for providing an adjustment in the phase of the successive pixels in the video data in accordance with the difference in the time between successive horizontal sync pulses and the adjacent ones of the system clock signals and in accordance with the number of system clock signals per line to have such pixels occur in synchronism with the system clock signals.

2. In a combination as set forth in claim 1, the fifth means including a buffer for storing the video data in at least a portion of each line, the fifth means being operative to provide an adjustment in time of the successive pixels in the buffer to occur in synchronism with the system clock signals.

3. In a combination as set forth in claim 1 wherein the third means includes sixth means for determining the adjustment in phase between the horizontal sync signal in each line and the adjacent one of the system clock signals and seventh means for storing such phase adjustment determination and eighth means for determining the difference between the stored phase adjustment from the seventh means for each line and the phase adjustment determined by the sixth means for each line to determine the phase adjustment to be made per line in the video data for providing the video data in synchronism with the system clock signals.

4. In a combination as set forth in claim 1 wherein the third means includes sixth means for determining the adjustment in phase between the horizontal sync signal in each line and the third means includes seventh means for providing an estimated adjustment in phase at the end of each line and the third means includes means for adjusting the estimated phase adjustment at the end of each line in accordance with the difference between the determinations by the sixth means and the estimated adjustment provided by the seventh means.

5. In combination, first means for providing system clock signals at a particular frequency, second means for providing video data in each of successive lines, the video data in each line being defined by a plurality of pixels and by a horizontal sync pulse preceding the pixels, third means for determining a phase adjustment between the horizontal sync pulse in each line and the adjacent system clock signal, fourth means for determining the phase difference between the phase adjustment from the third means and a particular one of actual and expected phase adjustment at the end of the line, and fifth means for providing an adjustment in the phase of each of the pixels in each line in accordance with the phase difference determined by the fourth means.

6. In a combination as set forth in claim 5 wherein the fourth means determines the phase difference between the phase adjustments determined by the third means in successive pairs of lines.

7. In a combination as set forth in claim 5 wherein the fourth means determines the difference between the phase adjustment determined by the third means for each line and the phase adjustment estimated for the end of such line and wherein sixth means are provided for adjusting, in accordance with the phase adjustment determined by the third means for each line, the phase adjustment estimated for the end of such line.

8. In a combination as set forth in claim 5, sixth means for determining the number of system clock signals in each horizontal line of the video data, and the fifth means being operative to provide an adjustment in the phase of each of the pixels in each line in accordance with the phase difference determined by the fourth means and the number of system clock signals determined by the sixth means.

9. In combination, first means for providing system clock signals at a particular frequency, second means for providing video data in successive lines each having a plurality of pixels and having a horizontal sync signal at the beginning of the line, third means for determining the occurrence of a particular threshold level in the horizontal sync signal, fourth means for determining a phase adjustment in each line between the particular threshold level of the horizontal sync signal in each individual line and the adjacent one of the system clock signals, fifth means for determining the difference between the phase adjustments for successive lines, and sixth means for providing progressive phase adjustments in the successive pixels in each individual line in accordance with the number of system clock signals in the line and the difference determined by the sixth means between the phase adjustments from the fourth means from the previous line and the fifth means for such individual line.

10. In a combination as set forth in claim 9, the fourth means including seventh means for estimating the phase adjustment to be provided by the sixth means between the pixels at the beginning of each line and the system clock signals and the sixth means including eighth means for changing the estimated phase adjustment by the seventh means for each line in accordance with the difference between the phase adjustments as determined by the fourth means.

11. In a combination as set forth in claim 9, the fourth means including seventh means for storing the phase adjustment determined by the fourth means in each individual line, the fifth means including seventh means for determining the difference between the phase adjustment from the fourth means for each individual line and the phase adjustments from the seventh means for the previous line in accordance with the number of system clock signals in the line.

12. In a combination as set forth in claim 9, means for providing a graphics system for the presentation of the video data, and buffer means for the pixels in at least a portion of each line as the portion of the line is being presented to the graphics system.

13. In a combination as set forth in claim 9,
means for providing the video data in a form of pixels representing luminance and chrominance,
means for converting the video data in the form of pixels representing the luminance and chrominance to video data in a form of pixels representing the primary colors,
the sixth means being responsive to the video data in the form of the pixels representing the primary colors to provide the progressive phase adjustments of the successive pixels in each line in accordance with the number of system clock signals in the line and the difference in the phase adjustments in successive lines determined by the fifth means.

14. In a combination as set forth in claim 13,
each of the pixels in the form representing the primary colors being defined by a plurality of bytes each representing an individual one of the primary colors and each having a plurality of bits, and
means responsive to the indications from the seventh means for converting the plurality of the bits in each byte to a particular number of bits greater than the number in the plurality.

15. In combination,
first means for providing system clock signals having a particular frequency,
second means for providing video data in the form of a plurality of successive pixels in each of a plurality of successive lines with each of the lines have a sync pulse defining the beginning of such line,
third means for visually presenting the video pixels, and
fourth means responsive to the horizontal sync pulse for successive pairs of lines and the system clock signals for shifting the phases of individual ones of the video pixels in the second one of such successive pairs of lines to have the phases of such individual ones of the video pixels in the second one of such successive pairs of lines correspond to the times of occurrence of the system clock signals.

16. In a combination as set forth in claim 15,
the fourth means being operative to shift the phases of the successive pixels in the second one of such successive pairs of lines progressively to have such phases correspond to the times of occurrence of the successive ones of the system clock signals.

17. In a combination as set forth in claim 15,
the fourth means including fifth means for determining the difference between a phase adjustment of the horizontal sync pulse in each line relative to the adjacent one of the system clock signals and the phase adjustment of the horizontal sync pulse in the previous line relative to the adjacent one of the system clock signals and further including sixth means for shifting the phases of the video pixels in each line in accordance with the difference determined by the fifth means.

18. In combination,
first means for providing system clock signals having a particular frequency,
second means for providing video data in the form of a plurality of successive pixels in each of a plurality of successive lines with each of the lines have a sync pulse defining the beginning of such line,
third means for visually presenting the video pixels,
fourth means responsive to the horizontal sync pulse for each line and the system clock signals for shifting the phases of individual ones of the video pixels in such line to have the phases of such individual ones of the video signals correspond to the times of occurrence of the system clock signals,
the fourth means being operative to shift the phases of the successive pixels in each line progressively to have such phases correspond to the times of occurrence of the successive ones of the system clock signals, and
the fourth means including fifth means for determining the phase adjustment of the horizontal sync pulse in each line relative to the adjacent one of the system clock signals and sixth means for providing the phase adjustment of the pixels relative to the system clock signals at the end of such line and seventh means responsive to the phase adjustments from the fifth and sixth means for each line for adjusting the phases of the video signals in such line to have such phases correspond to the times of occurrence of the system clock signals.

19. In combination,
first means for providing system clock signals at a particular frequency,
second means for providing video data in the form of successive pixels at a frequency different from the frequency of the system clock signals, the successive pixels being disposed in lines and the successive pixels in the lines being provided in a raster scan, the video data including a horizontal sync pulse at the beginning of each line,
third means responsive to each horizontal sync pulse and to the system clock signals for determining a phase adjustment between such horizontal sync pulse in each line and the system clock signals, and
fourth means for adjusting the phases of the successive pixels of the video data for each line in accordance with the determinations by the third means for that line.
the third means including fifth means for determining the phase adjustment between the pixels at the beginning of each individual line and the system clock signals and further including sixth means for determining the difference between the phase adjustments at the beginning of the line following each individual line and the system clock signals, and
the fourth means being responsive to the difference determinations from the fifth and sixth means for adjusting the phases of the successive pixels of the video data for the line following each individual line and in accordance with the difference determinations by the fifth and sixth means.

* * * * *